United States Patent
Kamata

(10) Patent No.: US 9,507,039 B2
(45) Date of Patent: Nov. 29, 2016

(54) SEISMIC SOURCE, SYSTEM, AND METHOD

(75) Inventor: Masahiro Kamata, Kawasaki (JP)

(73) Assignee: Schlumberger Technology Corporation, Sugar Land, TX (US)

(*) Notice: Subject to any disclaimer, the term of this patent is extended or adjusted under 35 U.S.C. 154(b) by 1171 days.

(21) Appl. No.: 13/316,583

(22) Filed: Dec. 12, 2011

(65) Prior Publication Data

US 2012/0145476 A1    Jun. 14, 2012

Related U.S. Application Data

(60) Provisional application No. 61/422,218, filed on Dec. 13, 2010.

(51) Int. Cl.
G01V 1/04     (2006.01)
G01V 1/153    (2006.01)

(52) U.S. Cl.
CPC ..................... *G01V 1/153* (2013.01)

(58) Field of Classification Search
CPC ....... G01V 1/143–1/155; G01V 1/133–1/137; F16L 23/036
USPC ................... 367/190; 403/2; 166/364; 285/3
See application file for complete search history.

(56) References Cited

U.S. PATENT DOCUMENTS

| | | | |
|---|---|---|---|
| 2,688,124 A | | 8/1954 | Doty et al. |
| 3,280,935 A | * | 10/1966 | Brown .......................... 367/189 |
| 3,997,021 A | | 12/1976 | Chelminski |
| 4,026,383 A | * | 5/1977 | Bedenbender et al. ...... 181/121 |
| 4,039,042 A | | 8/1977 | Edwards et al. |
| 4,234,053 A | * | 11/1980 | Erich, Jr. ...................... 181/121 |
| 4,590,801 A | * | 5/1986 | Merhav ........................... 73/510 |
| 4,702,123 A | * | 10/1987 | Hirao et al. .................... 74/526 |
| 4,709,362 A | | 11/1987 | Cole |
| 4,805,725 A | | 2/1989 | Paulsson |

(Continued)

FOREIGN PATENT DOCUMENTS

| | | |
|---|---|---|
| CA | 1122315 | 4/1982 |
| JP | 1301190 | 12/1989 |

(Continued)

OTHER PUBLICATIONS

Search Report for the equivalent Eurasian Patent Application No. 201101634.

(Continued)

*Primary Examiner* — Isam Alsomiri
*Assistant Examiner* — Amienatta M Ndure Jobe
(74) *Attorney, Agent, or Firm* — Jody Lynn DeStefani; Daryl R. Wright

(57) ABSTRACT

A seismic source of the present disclosure includes a first rotation member and a second rotation member having a common axis of rotation and rotated at a same rotational rate in mutually opposite directions. In addition, the seismic source may include a first mass that is eccentrically coupled to the first rotation member and rotates along with the first rotation member. A second mass may be eccentrically coupled to the second rotation member and configured to rotate along with that member. The second mass may be configured such that the center of gravity of the second mass is located radially external to the center of gravity of the first mass relative to the common axis of rotation. The center of gravities of the first and second mass may be located at the same location along a length of the common axis of rotation.

10 Claims, 17 Drawing Sheets

(56) References Cited

U.S. PATENT DOCUMENTS

| | | | |
|---|---|---|---|
| 4,874,061 A | 10/1989 | Cole | |
| 4,893,290 A * | 1/1990 | McNeel et al. | 367/178 |
| 5,048,552 A * | 9/1991 | Bourne | 137/39 |
| 5,416,281 A * | 5/1995 | Ogura | 181/106 |
| 6,085,772 A * | 7/2000 | McGill et al. | 137/39 |
| 6,561,714 B1 * | 5/2003 | Williams et al. | 403/2 |
| 7,171,866 B2 | 2/2007 | Fervers et al. | |
| 8,347,716 B2 * | 1/2013 | Cazzaniga et al. | 73/504.12 |
| 8,794,372 B2 * | 8/2014 | Harper et al. | 181/113 |
| 8,837,259 B2 * | 9/2014 | Ruet et al. | 367/142 |
| 2002/0096004 A1 * | 7/2002 | Gagner | 74/84 S |
| 2009/0088623 A1 * | 4/2009 | Vortman et al. | 600/411 |
| 2011/0011668 A1 * | 1/2011 | Hampshire et al. | 181/113 |
| 2012/0279301 A1 * | 11/2012 | Gunthner et al. | 73/504.12 |
| 2013/0272089 A1 * | 10/2013 | Coste | 367/15 |

FOREIGN PATENT DOCUMENTS

| | | | |
|---|---|---|---|
| JP | 10142345 | | 5/1998 |
| RU | 2006882 | | 1/1994 |
| SU | 543906 | * | 1/1977 |
| SU | 543906 A1 | | 1/1977 |
| SY | 543895 | | 1/1977 |

OTHER PUBLICATIONS

Office action for the equivalent Eurasian patent application No. 201101634 issued on Aug. 25, 2015.

Office Action issued in related EA Application No. 201101634 mailed Sep. 19, 2014, with English translation by agent (4 pages).

* cited by examiner

Rotating at low rpm

Rotating at high rpm

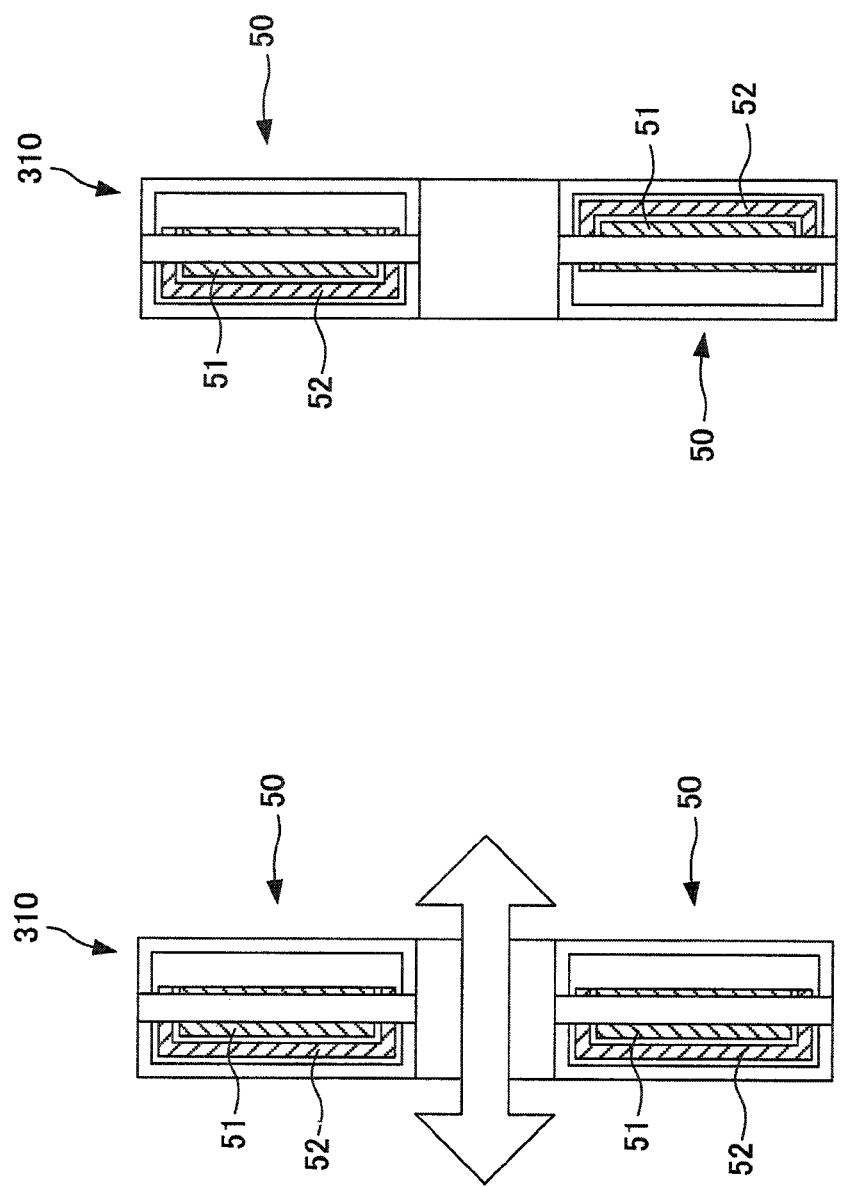

SEISMIC SOURCE, SYSTEM, AND METHOD

RELATED APPLICATIONS

This application claims the benefit of U.S. Provisional Application No. 61/422,218, filed Dec. 13, 2010, the contents of which are herein incorporated by reference for all intents and purposes.

BACKGROUND

The following descriptions and examples are not admitted to be prior art by virtue of their inclusion in this section.

The present disclosure relates generally to a seismic source, system, and method for performing acoustic measurement and analysis of subsurface geological strata and layers. More specifically, some embodiments disclosed herein may be directed to a seismic source, system and method used for placing seismic devices, such as a seismic source and a seismic receiver, downhole in a well. The seismic devices may then be used to identify characteristics of subsurface layers including such features as oil and gas deposits located therein, for example.

In a typical seismic survey, seismic signals are generated by producing seismic waves. The seismic waves may be reflected off of various subsurface features due to the contrasting acoustical impedance present at stratum boundaries. These reflected seismic waves are collected as seismic data and are analyzed to provide a representational image of a subsurface structure or feature. As an example, in some systems a vibrator, for generating seismic waves, and one or more geophones, used for receiving reflected seismic waves, may be located on the ground surface.

However, it is known that there is a low velocity surface layer near the ground surface that attenuates portions of the generated seismic waves. In a typical ground surface survey, the generated waves must pass through this attenuation layer, be reflected off of the subsurface feature located thousands of meters below the surface in some cases, and then the reflected seismic waves must pass through the attenuation layer a second time prior to being received by the ground based receivers.

The low velocity surface layer attenuates high frequency seismic waves. However, high frequency seismic waves also have the ability to propagate relatively long distances through the ground. The low velocity surface layer has a greater impact on the portion of the generated seismic wave that has the best chance of reaching a subsurface feature located deep underground.

Any high frequency seismic waves that do reach the subsurface feature and are reflected back towards the ground surface have to pass again through the low velocity subsurface layer. This reduces the ability of the high frequency portion of the reflected seismic wave from eventually reaching a geophone (or other seismic receiver) located on the ground surface.

Consequently, the reflected seismic waves detected by a ground based geophone during a survey of a subsurface target have frequencies that are less likely to be attenuated. In some cases, the frequency range of reflected seismic waves is located, for example, in a range of frequencies between 10 Hz and 60 Hz. Higher frequency waves would be able to go farther and provide a more precise picture of the subsurface characteristics.

One alternative is to use seismic waves generated by a seismic source, such as detonating dynamite for example, below the low velocity surface layer. Generated seismic waves would then pass through the low velocity surface layer only once before being detected by a geophone placed on the ground surface. High-frequency seismic waves would be less likely to be attenuated as compared with a case where the generated seismic waves pass through the low velocity surface layer twice. Accordingly, the geophones may capture slightly higher-frequency reflected seismic waves.

Taking this idea one step further, when the receiver is placed below the surface in a well, seismic waves never pass through the low velocity surface layer before being detected by the in well geophones. Then, high-frequency seismic waves are less likely to be attenuated as compared with the case where generated and reflected seismic waves must pass through the low velocity surface layer twice. In such cases, the in well geophones may capture even higher-frequency reflected seismic waves.

In addition, since a propagation path of seismic waves from the point of generating seismic waves to the reflected surface and back to the in well geophones is shortened, the in well geophones may capture greater amounts of higher-frequency seismic waves, increasing the precision and analysis of the subsurface features.

However, to explode dynamite below the low velocity surface layer, it is required to drill a hole for each time of explosion. Also, since the propagation path of seismic waves generated by a dynamite explosion is in the limited range of 50 m to 100 m, high-frequency seismic waves are more likely to be attenuated. Thus, a high resolution image is less likely to be obtained.

SUMMARY

In accordance with one embodiment of the disclosure, a seismic source is described including a first rotation member and a second rotation member having a common axis of rotation and rotated at a same rotational rate in mutually opposite directions.

In addition, the seismic source may include a first mass that is eccentrically coupled to the first rotation member and rotates along with the first rotation member. A second mass may be eccentrically coupled to the second rotation member and configured to rotate along with that member. The second mass may be configured such that the center of gravity of the second mass is located radially external to the center of gravity of the first mass relative to the common axis of rotation. The center of gravities of the first and second mass may be located at a same location along a length of the common axis of rotation.

In accordance with another embodiment of the disclosure, a seismic source is detailed that such that the magnitude of a generated seismic signal is adjustable. In accordance with another embodiment of the disclosure, the generated seismic signal is rotatable about a common axis of rotation.

In accordance with another embodiment of the disclosure, a seismic system is detailed that includes a downhole seismic source. The seismic system may further include a sensor that detects a measured seismic signal related to the generated seismic signal and produces an output signal corresponding to the measured seismic signal. A signal processing system may be included to process the output signal to indicate a subsurface characteristic. A controller may also be included to control the seismic source.

Other or alternative features will become apparent from the following description, from the drawings, and from the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 12 is a schematic view illustrating relative positions of rotating masses of a first mode vibration system in a seismic source, according to an embodiment of the disclosure;

FIG. 13 is a schematic view illustrating relative positions of rotating masses of a second mode vibration system in a seismic source, according to an embodiment of the disclosure;

DETAILED DESCRIPTION

Figure 1:
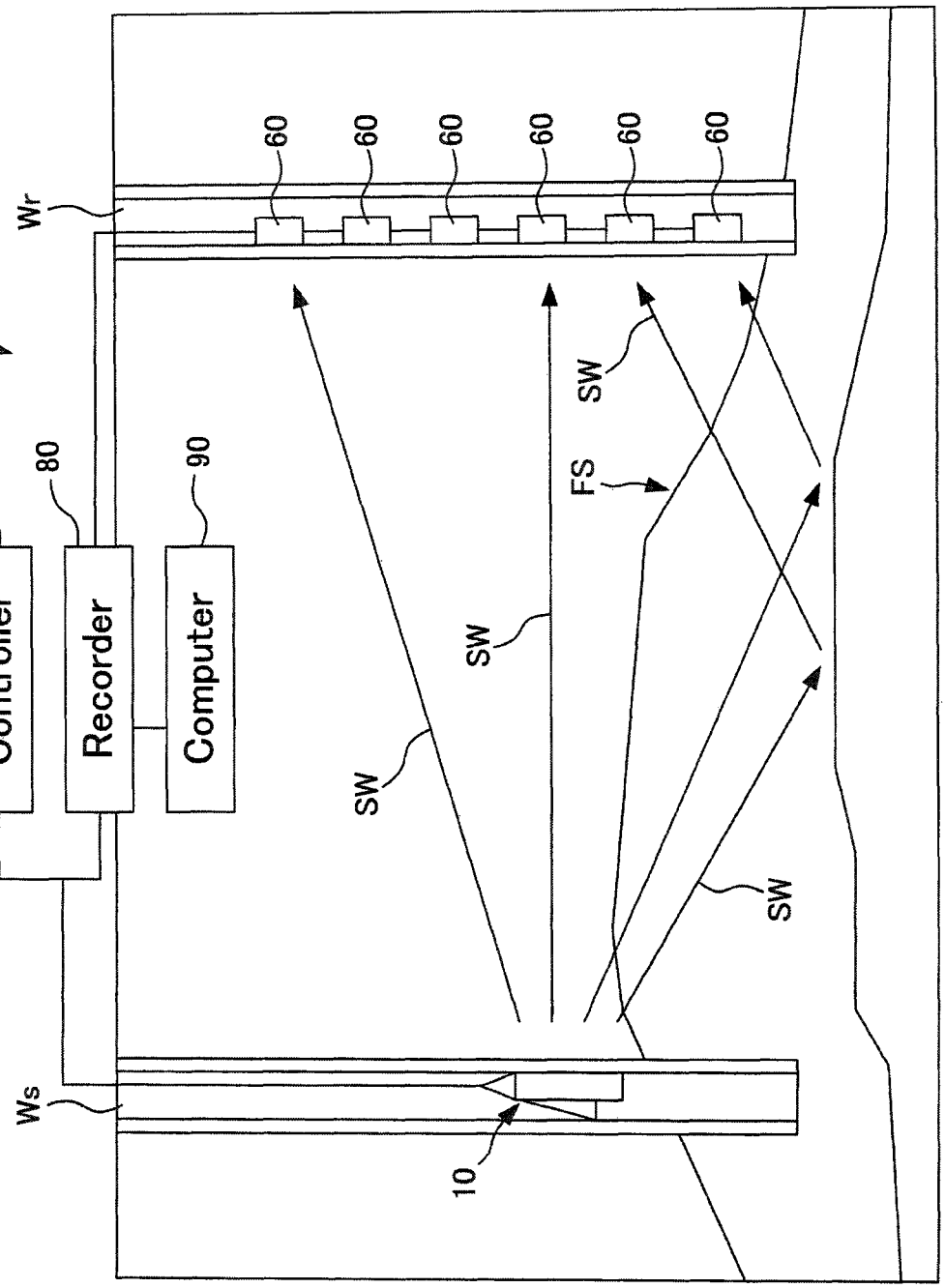
FIG. 1 is a block diagram illustrating an outline of a seismic system in an embodiment of the disclosure.

Illustrative embodiments and aspects of the disclosure are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole.

The tools and sensing systems disclosed herein may effectively sense and store characteristics relating to components of downhole tools as well as formation parameters at elevated temperatures and pressures. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the disclosure.

Moreover, inventive aspects lie in less than all features of a single disclosed embodiment. Thus, the claims following the Detailed Description are hereby expressly incorporated into this Detailed Description, with each claim standing on its own as a separate embodiment of this disclosure.

A seismic system and a seismic source will be described hereinafter in an exemplary embodiment generally illustrated in FIG. 1 through FIG. 6B. In order to simplify the description, a cross-hole seismic survey such as the one generally shown in FIG. 1 will be used to describe a seismic system. However, as is readily apparent, a person of skill in the art would recognize that the teachings of this disclosure may be applied to a wide range of seismic systems, including but not limited to 2-D and 3-D vertical seismic profiling (VSP), walkaway systems, and reverse VSP in which the locations of the seismic source and receivers are reversed, among others.

Referring generally to FIG. 1, seismic system 1 is configured for conducting a cross-hole seismic survey. Seismic system 1 may include a seismic source 10 located in well Ws and one or more seismic receivers 60 provided in well Wr. Well Ws and Wr may be located so as to sandwich a subsurface structure intended as a survey target. Generated seismic waves SW may be produced by the seismic source 10, travel through the intervening geological strata while being reflected off of the subsurface feature, and then be received by the one or more seismic receivers 60.

Generally, an exemplary seismic system 1 may include the seismic source 10, one or more seismic receivers (sensors) 60, a controller 70, a recorder 80, and a computer (signal processing section) 90. The seismic source 10 produces generated seismic waves SW to interact with the survey target.

Each seismic receiver 60 is configured to detect the generated seismic waves that have propagated directly through the survey target as well as generated seismic waves that have been reflected off of the survey target. The seismic receivers 60 are also configured to output a signal corresponding to the detected or measured seismic waves.

The controller 70 may control the production of generated seismic waves emanating from the seismic source 10. In some cases, the controller 70 may also control the rotational direction (about a common axis of rotation described later) of the generated seismic signal and/or the magnitude of the generated seismic signal. The recorder 80 may record output signals provided by the seismic receivers 60. A computer 90 may be used to analyze the detected or measured signals corresponding to the seismic waves related to the generated seismic waves that are stored by the recorder 80.

In some embodiments, the seismic system 1 may be configured such that the computer 90 is separately provided while the seismic source 10, the one or more seismic receivers 60, the controller 70 and the recorder 80 are integrally provided. While in other embodiments it may be possible to store results of the output signals corresponding to the generated seismic signals of the seismic source 10 and the plurality of seismic receivers 60 in the recorder 80. Subsequently, either remotely in location and/or time, the stored output signals located in the recorder 80 may be communicated to the computer 90 for analysis.

In some cases, embodiments of seismic system 1 may be configured such that the recorder 80 is not included and the seismic source 10, the one or more seismic receivers 60, the controller 70 and the computer 90 are communicatively coupled together. In this case, the detected signals outputted from the seismic receivers 60 may be directly input into the computer 90 for analysis. Computation results by the computer 90 may be communicated, for example, through an output section (not shown), such as a printer, video monitor, other sensory display mechanisms, wireless or wired transmitter, or stored for further transmission to a remote location.

Seismic source 10 is shown as generally having a columnar/cylindrical shape and is conveyed with a wireline cable (in this embodiment) inside the well Ws. The outside diameter of the seismic source 10 is configured to be smaller than the inside diameter of the well Ws. In some embodiments, the wireline cable may enable communication of power, data, and control signals between the seismic source 10 and the controller 70.

Figure 2:
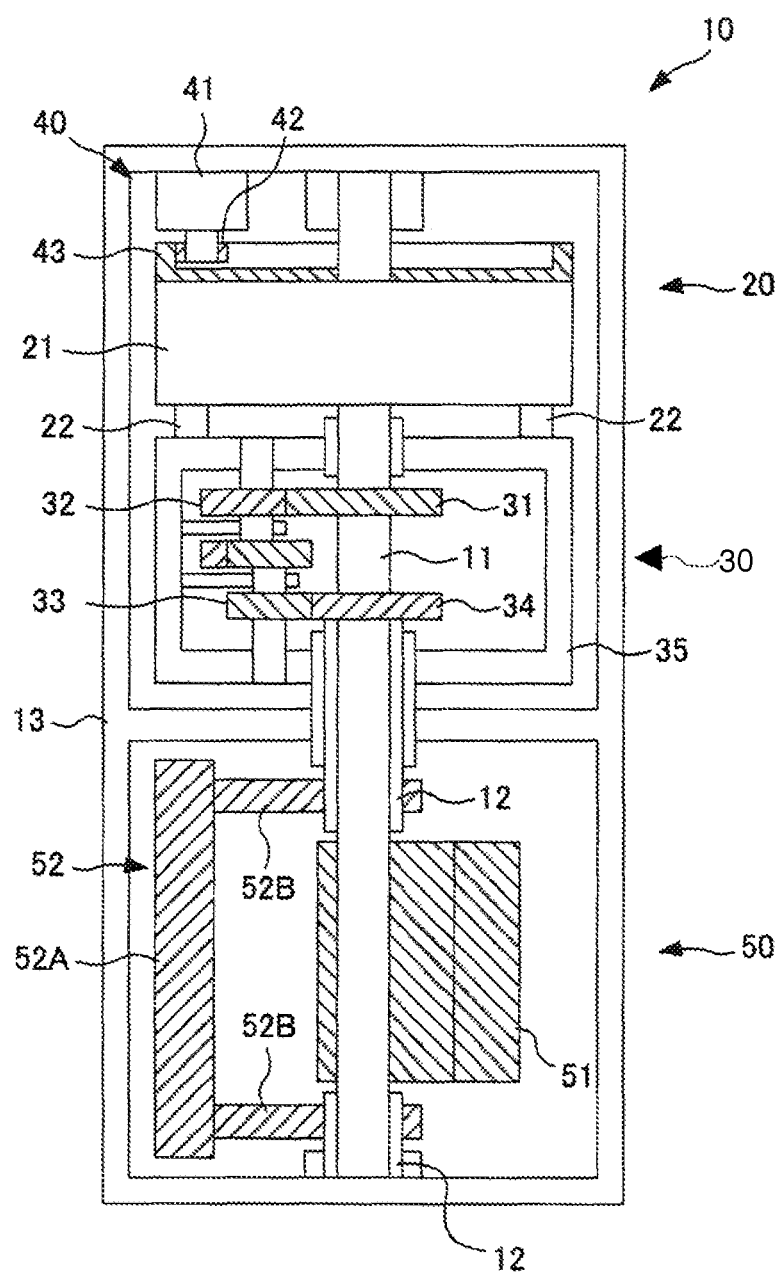
FIG. 2 is a cross-sectional view illustrating a configuration of one example of a seismic source that may be used in an embodiment of the disclosure.

As generally shown in FIG. 2, an embodiment of the seismic source 10 may include a drive system 20, a first rotation member 11, a second rotation member 12, and a vibration system 50. The various components may be contained within a seismic source housing 13 that houses the drive system 20 and the vibration system 50.

The drive system 20 may includes a rotational device such as a drive motor (drive unit) 21, a transmission section 30, and a phase shift section 40. In this embodiment, the drive motor 21 rotates the first rotation shaft 11. A transmission section 30 may be included to rotate the second rotation member 12 in an opposing direction to the first rotation member 11.

The phase shift section 40 may be configured to alter the relative angular location of the overlapping first rotation member 11 and the second rotation member 12 in cooperation with the transmission section 30. In other words, the phase shift section 40 may be able to rotate the generated seismic signal about the common axis of rotation of the first and second rotation members 11, 12.

The drive motor 21 may be powered via a drive current controlled by the controller 70. However, the source of the drive current may not be limited to this illustrative transmission system. In some situations, a battery, optic source, or wireless transmission may be used to power the drive motor 21 and generate a rotational driving force. In still other systems, the cable/conveyance system may provide the rotating force.

The generated rotational driving force may be applied to the first rotation member 11 as shown in this embodiment for the convenience of description. The generated rotational driving force may similarly be applied to the second rotation member 12 or to both rotation members simultaneously. In this case, the rotational axis of the drive motor 21 functions as the first rotation member 11. However, in other embodiments, there may be additional members or components between the drive motor 21 and the first rotation member 11.

The casing of the drive motor 21 may be configured in a cylindrical shape with both ends closed. The ends of the casing of the drive motor 21 may rotatively support the first rotation member 11 via bearings for example. In some embodiments, the first rotation member 11 may be configured as a shaft. As with the casing of the drive motor 21, the first rotation member 11 may be coupled to the seismic source housing 13 via bearings.

The second rotation member 12 may be configured with a cylindrical shape able to accommodate the first rotation member 11 at least partially inside of the second rotation member 12. For example, a sliding bearing or another type of bearing, such as an axle bearing, may be sandwiched between an inner circumferential surface of the second rotation member 12 and an outer circumferential surface of the first rotation member 11.

Figure 3A:
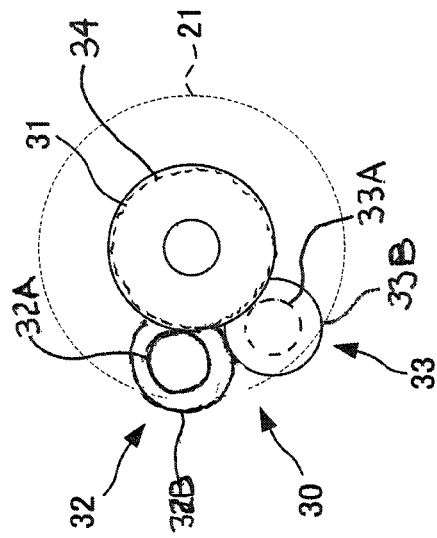
FIG. 3A is a schematic view illustrating a configuration of a transmission section of an example of a seismic source, according to an embodiment of the disclosure.
Figure 3B:
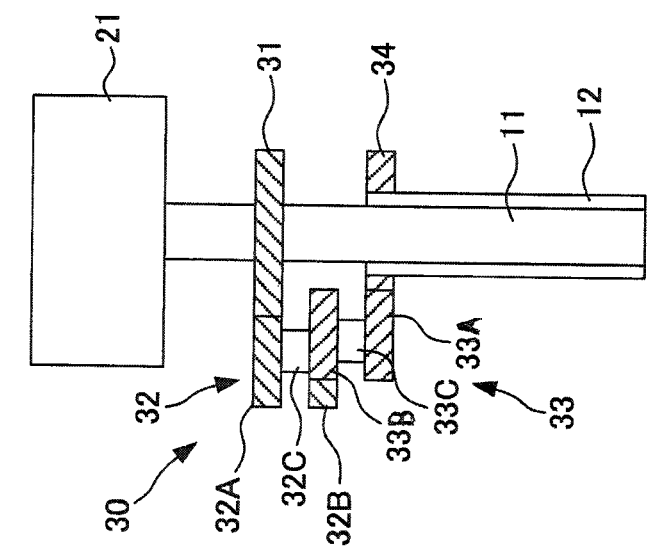
FIG. 3B is a top plan view of FIG. 3A.
Figure 4:
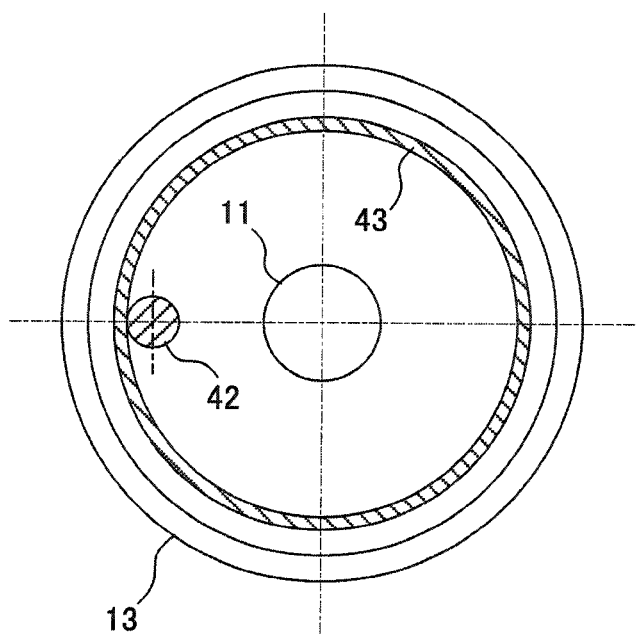
FIG. 4 is a top plan view illustrating an arrangement of a phase shifting system according to an embodiment of the disclosure.

As generally shown in FIG. 2 through FIG. 3B, the transmission section 30 may rotate the second rotation member 12 in an opposite direction to the first rotation member 11, but at the same angular velocity or angular rotation rate. Embodiments of the transmission section 30 may include a first rotation gear 31, a first transmission gear unit 32, a second transmission gear unit 33, a second rotation gear 34, and a transmission housing 35.

The first transmission gear unit 32 may be driven by the first rotation gear 31, which is coupled to the first rotation member 11. The second transmission gear unit 33 may be counter rotatively driven by the first transmission gear unit 32. The second transmission gear unit 33 may in turn drive the second rotation gear 34, which is coupled to the second rotation member 12. The transmission housing 35 couples and supports the first transmission gear unit 32 and the second transmission gear unit 33 in a rotatable manner.

Turning generally to FIGS. 3A and 3B, the first transmission gear unit 32 may include a first driving gear 32A, a first counter gear 32B, and a first shaft 32C connecting the first driving gear 32A to the first counter gear 32B. Similarly, the second transmission gear unit 33 may include a second driving gear 33A, a second counter gear 33B, and a second shaft 33C connecting the second driving gear 33A to the second counter gear 33B.

The first driving gear 32A may be driven by the first rotation gear 31. This rotates the first shaft 32C which in turn rotates the first counter gear 32B. The first counter gear 32B drives the second counter gear 33B, causing it to rotate in the opposite direction than the first counter gear 32B. The second counter gear 33B rotates the second shaft 33C which in turn rotates the second driving gear 33A. The second driving gear 33A drives the second rotation gear 34, accordingly rotating the second rotation member 12 in an opposing direction to the first rotation member 11 but at the same rotational rate.

Although a relatively simplistic gear train is shown for the purposes of facilitating the detailed description, a person skilled in the art would easily recognize that any number of combinations of driving, driven, and counter rotating gears may be used to produce the same rotational rates in opposing directions. Embodiments of this disclosure should not be limited to this illustrative transmission system 30.

In some embodiments, the casing of the drive motor 21 and the transmission housing 35 may be configured to rotate (phase shift) relative to the seismic source housing 13. Rotating the transmission housing 35 would cause a corresponding rotation in the generated seismic signal about the common axis of rotation of the seismic source 10.

Returning generally to FIG. 2, a phase shift system 40 may be provided in some embodiments of the seismic source 10 of this disclosure in order to rotate (phase shift) the direction of the generated seismic signals about the common axis of rotation. The phase shift section 40 may include a phase shift motor 41, a first phase shift gear 42, and a second phase shift gear 43.

The phase shift motor 41 may generate a rotational driving force. The rotation produced by the phase shift motor 41 may cause a corresponding rotation in the first phase shift gear 42 coupled to the phase shift motor 41. The first phase shift gear 42 may drive the second phase shift gear 43 through an angle control by a control signal received from the controller 70. In this embodiment, the second phase shift gear 43 is contained within a portion of the casing of the drive motor 21.

As the second phase shift gear 43 rotates, the casing of the drive motor 21 rotates. The housing of the drive motor 21 may be coupled to the transmission housing 35 via connecting members 22. As the drive motor's 21 housing rotates, the transmission housing 35 may rotate through the same corresponding angle. Accordingly, the application of the maximum and minimum generated seismic signal would be rotated about the common axis of rotation through the same corresponding angle as the transmission housing 35. In some embodiments, a stepping motor, for example, may be used as the phase shift motor 41.

Figure 5:
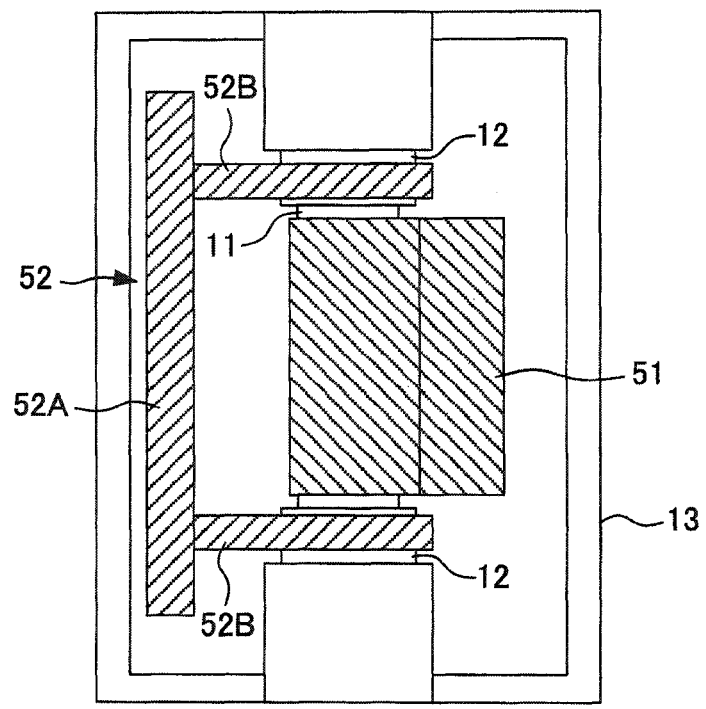
FIG. 5 is a schematic view illustrating a configuration of a vibration system, according to an embodiment of the disclosure.

One embodiment of the vibration system 50 converts the rotation generated by the drive section 20 to a substantially linear vibration. As shown in FIG. 5, the vibration system 50 may include an inner mass 51 (a first mass) attached to the first rotation member 11 and an outer mass 52 (a second mass) attached to the second rotation member 12. In some embodiments, a relatively high density material may be used for the masses, such as but not limited to metal materials such as lead. In some cases combinations of materials may be used and may be configured for adjusting in terms of balance and location of the center of gravity.

Figure 6A:
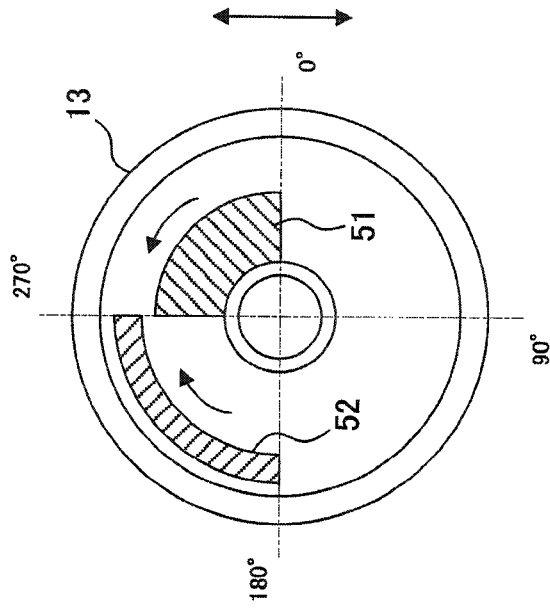
FIG. 6A is a top plan view illustrating relative positions of the first mass and the second mass of a seismic source according to an embodiment of the disclosure.
Figure 6B:
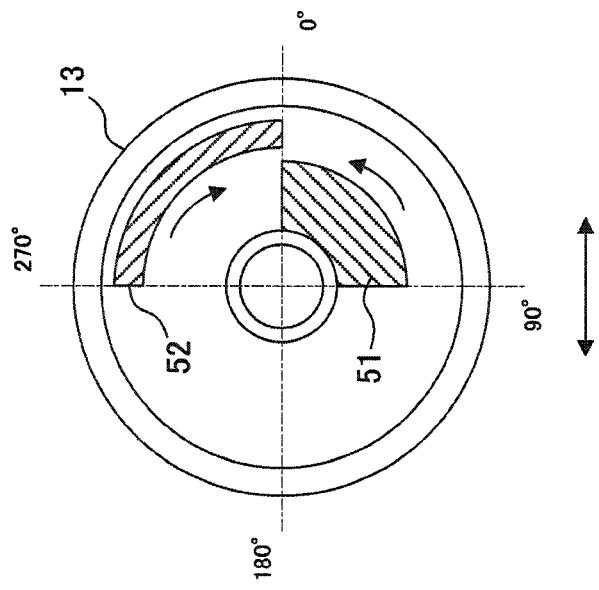
FIG. 6B is a top plan view illustrating another relative positions of the first mass and the second mass of FIG. 6A.
Figure 7B:
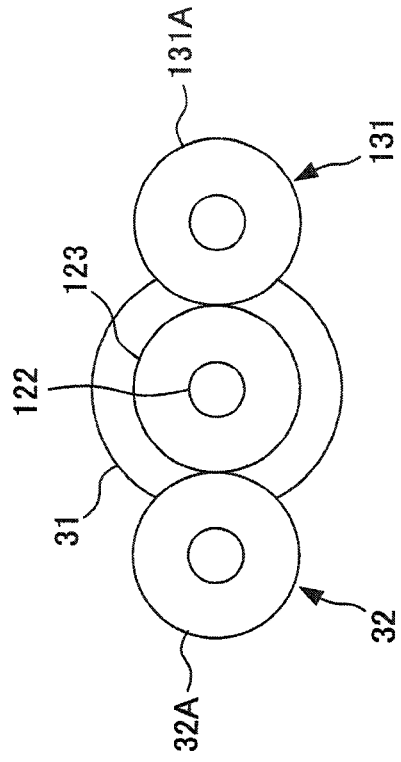
FIG. 7B is a top plan view of FIG. 7A.
Figure 7A:
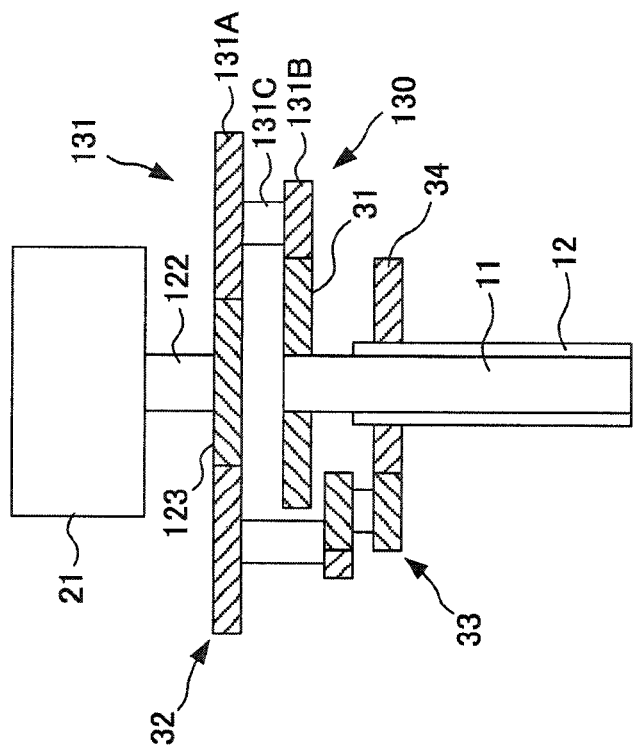
FIG. 7A is a schematic view of a drive section of a seismic source according to an embodiment of the disclosure.

As shown in FIG. 5 and FIG. 6A, the inner mass 51 is eccentrically located relative to the common axis of rotation of the first rotation member 11. In some embodiments, the inner (i.e., referring to the location of the center of gravity relative to the outer mass 52) mass 51 may have a substantially sector shaped cross section as more readily seen in FIGS. 6A and 6B. However, the shape of the inner mass 51 may not be limited to this example. Other shapes and configurations should be readily apparent to one of skill in the art and may be selected due to size and material constraints. The inner mass 51 is fixed relative to the first rotation member 11 and accordingly rotates at the same angular velocity or rate as the first rotation member 11.

The outer mass 52 may include a mass portion 52A and one or more attachment legs 52B (two are shown in this example). The mass portion 52A may be a curved member configured to accommodate the rotation of the inner mass 51. The mass portion 52A may extend along the first rotation member 11 and be fixedly coupled to the second rotation member 12. In the embodiment shown, the mass portion 52A has an arc-shaped cross section more readily seen in FIGS. 6A and 6B.

The pair of attachment legs 52B connects the mass portion 52A to the second rotation member 12. As with the mass portion 52A, the pair of attachment legs 52B may be configured to accommodate the rotation of the inner mass 51. Although a pair of attachment legs 52B is shown, in some embodiments a single attachment leg 52B may be used. The outer mass 52 is arranged so that the center of gravity of the outer mass 52 is located at a position radially exterior to the location of the center of gravity of the inner mass 51.

Of course, in some cases the mass of the outer mass 52 may be substantially included in the pair of attachment legs 52B (embodiment not shown). In such a case, the so called mass portion 52A would be substantially a connecting portion transmitting the rotation of one attachment leg 52B to the other attachment leg 52B. However, in this case, the center of gravity of the combined mass located in the pair of attachment legs 52B would still coincide with the center of gravity of the inner mass 52A along a length of the common axis of rotation.

In some embodiments the centrifugal force generated by the rotation of the inner mass 51 should substantially equal the centrifugal force generated by the same rotation of the outer mass 52. In this case, when the center of gravity of the inner and outer masses 51 and 52 are directly opposite to one another (e.g., on either side of the common axis of rotation, 180° apart), their centrifugal forces will essentially cancel one another resulting in no net force generated by the seismic source 10 along one direction. However, when the center of gravity of the inner and outer masses 51 and 52 are in the same angular location (e.g., on the same side of the axis of rotation and both contained within a single plane extending from and containing the common axis of rotation), their centrifugal forces add together, resulting in a net force generated by the seismic source 10 in a first and second direction substantially along a line.

The centrifugal forces should follow the well known formula of Force=mass*radial distance*angular velocity squared. The radial distances and masses of the inner and outer mass 51 and 52 should be chosen such that inner mass 51*radial distance of the center of gravity of inner mass 51 is equal to the outer mass 52*radial distance of the center of gravity of the outer mass 52. The radial distances are measured from the common axis of rotation.

During a single rotation, the inner and outer masses 51 and 52 will have two occurrences of their centrifugal forces cancelling each other out. Additionally, in that same single rotation, there will be one instance of the centrifugal forces adding to generate a net force in one direction, and another instance in which the centrifugal forces will add to generate a net force acting 180° to the previous net force. The inner mass 51 will make one complete rotation in one direction while the outer mass 52 makes one complete rotation in the opposite direction.

In the embodiment described above, the first rotation member 11 and the second rotation member 12 are arranged concentrically so as to have a common axis of rotation. Accordingly, it is possible to reduce the overall cross-sectional area of the seismic source 10, thereby facilitating the use of the seismic source 10 in relatively small well bores. In addition, since the outer mass 52 is arranged radially outside of the inner mass 51 but at substantially the same location along the length of the common axis of rotation, it is possible to reduce the overall length of the seismic source 10.

By making the centrifugal force generated by the rotation of the inner mass 51 substantially equal to the centrifugal force generated by the rotation of the outer mass 52, the seismic source 10 vibrates primarily along a given linear direction perpendicular to the common axis of rotation. In addition, the magnitude of the generated seismic signal may be adjusted by changing the distance of the center of gravities of the inner and outer masses 51 and 52 from the axis of rotation and/or changing the amount of the inner and outer masses 51 and 52. In addition, changing the same angular rotational rate also changes the magnitude of the generated seismic signal. Although the centrifugal forces are described as substantially equal, in some cases the magnitudes of the centrifugal forces may be different, resulting in the generation of additional net effects from the seismic source 10.

Figure 8:
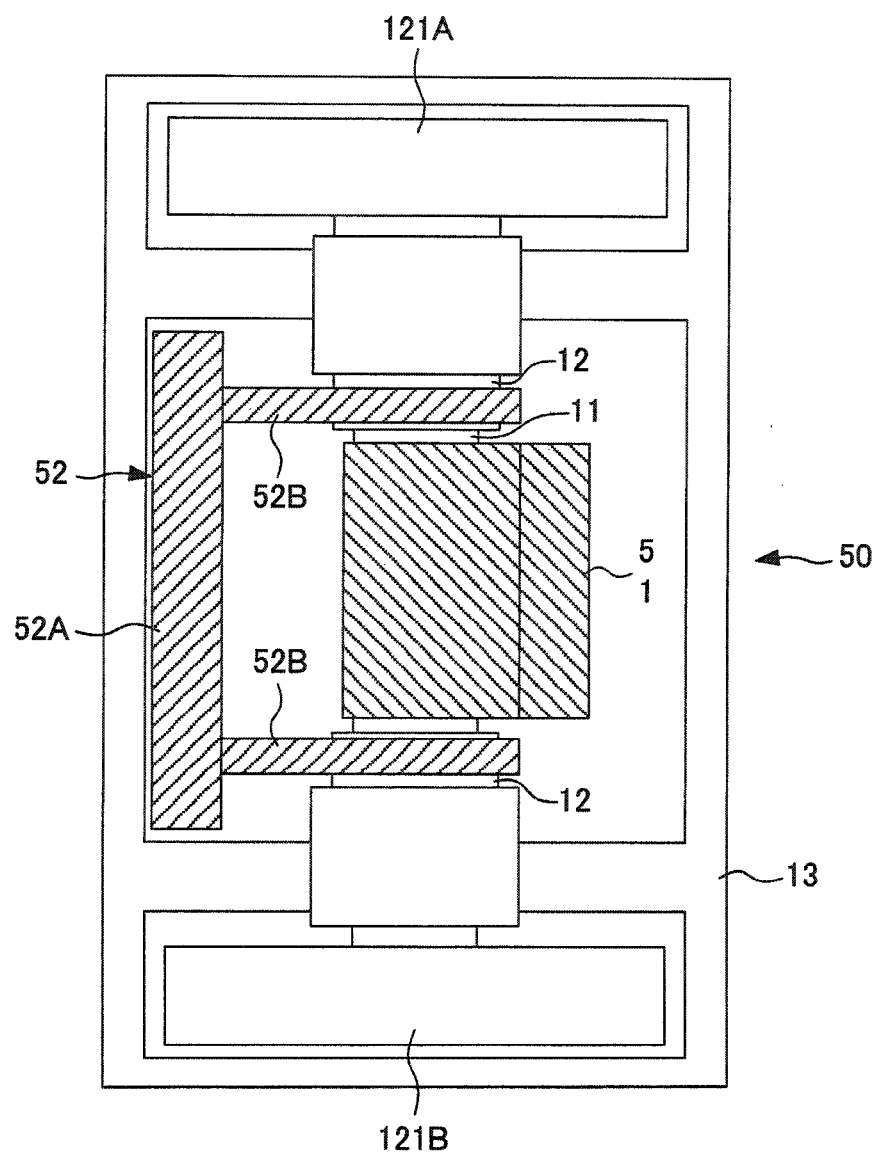
FIG. 8 is a schematic view of a drive section of a seismic source according to an embodiment of the disclosure.

Although in the above described embodiment the inner mass 51 and the outer mass 52 are rotationally driven by a single motor 21, in other embodiments there may be more than one driving device. For example, referring generally to FIG. 8, an inner drive motor 121A (a first drive section) may rotationally drive the inner mass 51, and an outer drive motor 121B (a second drive section) may rotationally drive the outer mass 52. In this case, a separate transmission section 30 as in the previous embodiment would not be needed. In some situations, the inner drive motor 121A and the outer drive motor 121B may be stepping motors (for example) and the controller 70 may be able to separately control the rotation of the inner drive motor 121A and the outer drive motor 121B.

By altering the rotational velocities of the inner drive motor 121A as compared to the outer drive motor 121B, the direction of the generated seismic signal may be rotated about the common axis of rotation, thereby eliminating the need for a separate phase shift section 40. Depending upon the control scheme of the controller 70, the transmission section and the phase shift section 40 may be eliminated, thereby simplifying the overall seismic tool 10 while providing the same functionality.

The inner drive motor 121A and the outer drive motor 121B may be arranged with the vibration system 50 located there between. With this configuration, the overall length of the seismic source 10 may be minimized.

Figure 9:
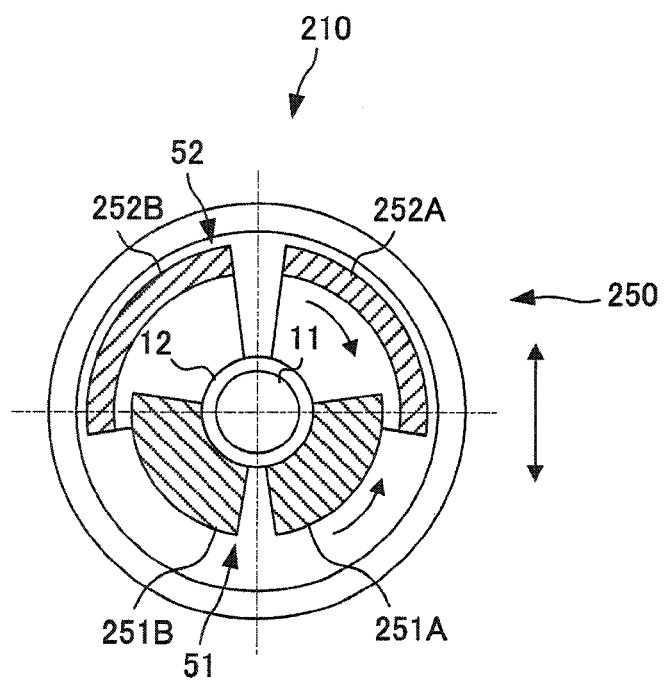
FIG. 9 is a top plan view illustrating a configuration of a vibration system in a seismic source of a seismic system in an embodiment of the disclosure.
Figure 10:
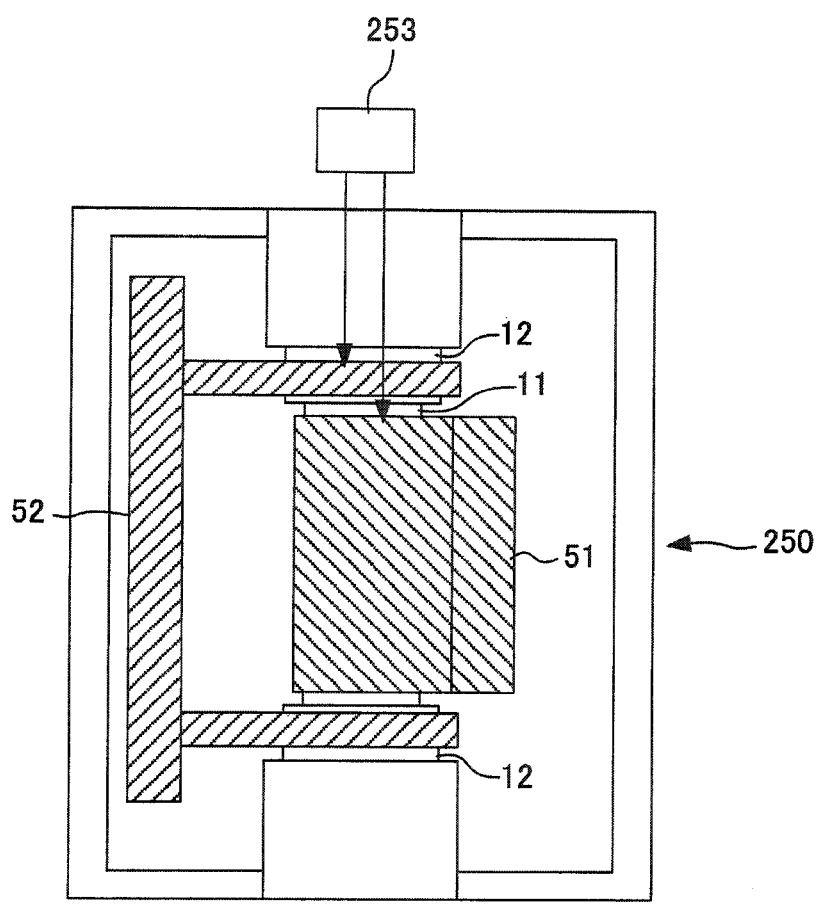
FIG. 10 is a schematic view illustrating a vibration system of a seismic source according to an embodiment of the disclosure.

Another embodiment of the seismic tool 210 is shown in FIGS. 9 through 11. As shown in FIG. 9, an embodiment of the vibration system 250 may include an inner mass 51, an outer mass 52. The inner mass 51 may include two or more inner divided bodies 251A, 251B (two are shown in the figure) coupled to the first rotation member 11. The outer mass 52 may include two or more outer divided bodies 252A, 252B (two are shown in the figure) coupled to the second rotation member 12.

A mass shift section 253 (shown in FIG. 10) causes the inner divided bodies 251A, 251B to rotatively approach or depart from each other about the axis of rotation and also causes the outer divided bodies 252A, 252B to rotatively approach or depart from each other about the axis of rotation. The rotative movement of the divided bodies towards or apart from their corresponding divided bodies alters the location of their respective eccentric centers of mass relative to the axis of rotation (i.e., increasing or decreasing the radial distance of the net center of mass of combined inner divided bodies 251A, 251B and the combined outer divided bodies 252A, 252B).

However, in some cases, the inner divided bodies 251A, 251B and the outer divided bodies 252A, 252B are moved such that the eccentricities (i.e., radial distance from the axis of rotation) of the net centers of mass are changed by an equivalent amount. As a result, the net centrifugal force generated by the rotation of the first rotation member 11 and the inner divided bodies 251A, 251B substantially equals the net centrifugal force generated by the rotation of the second rotation member 12 and the outer divided bodies 252A, 252B, when the net center of masses of the inner and outer divided bodies 251A, 251B, 252A, 252B are diametrically opposed to one another on opposite sides of the axis of rotation.

When the net centers of mass of the inner and outer divided bodies 251A, 251B, 252A, 252B are in a single radial line extending from the axis of rotation, the net centrifugal force generated by the divided bodies produces a vibration in one direction or another substantially along a line. when the center of mass of the inner and outer divided bodies 251A, 251B, 252A, 252B are directly opposed to each other on opposite sides of the axis of rotation.

In some embodiments, each of the inner divided bodies 251A, 251B may be a columnar member extending along the first rotation shaft 11. A cross-sectional view of the inner divided bodies may be in the form of a sector-shaped section generally extending from the axis of the first rotation member 11. Accordingly, rotation of the first rotation member 11 correspondingly rotates both of the inner divided bodies 251A, 251B.

In some embodiments, each of the outer divided bodies 252A, 252B may be configured in the form of a curved plate member and one or more attachment legs (two are shown in FIG. 10). The curved plate member extends along the first rotation shaft 11 and the second rotation shaft 12 and accommodates rotation of the inner mass 51. In embodiments configured for a substantially linear vibration, a plane perpendicular to the axis of rotation may contain the net centers of mass of both the inner mass 51 and the outer mass 52. This would allow for a bi-directional vibration force diametrically applied perpendicular to the axis of rotation. If the net centers of mass of both the inner mass 51 and the outer mass 52 were not contained within the same plane, a moment would be applied by the vibration system 250 when the net centers of mass were diametrically opposite to one another.

Figure 11B:
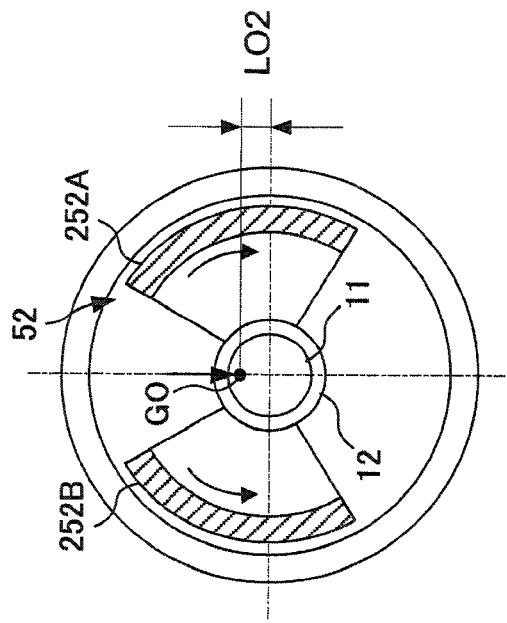
FIG. 11B is a schematic view illustrating relative positions of the mass shown in FIG. 11A while positioned for lower amplitudes of vibration in the vibration system, according to an embodiment of the disclosure.
Figure 11A:
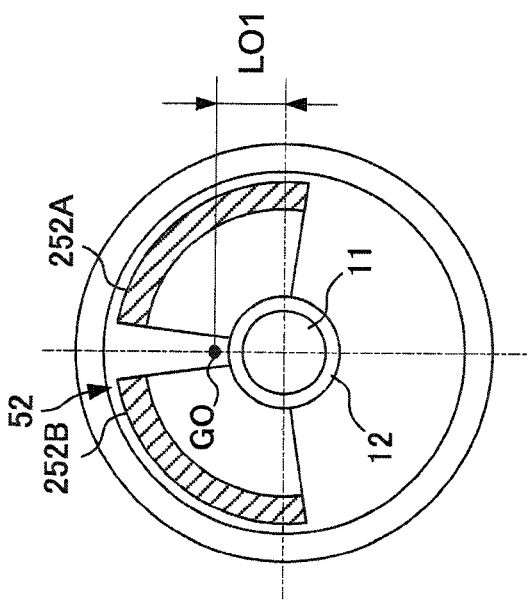
FIG. 11A is a schematic view illustrating relative positions of a mass used to change the amplitude of vibration in the vibration system, according to an embodiment of the disclosure.

As previously stated, in some embodiments the mass shift section 253 (shown in FIG. 10) causes the pair of inner divided bodies 251A, 251B to rotatively approach or depart from one another, and also causes the pair of outer divided bodies 252A, 252B to rotatively approach or depart from one another. FIGS. 11A and 11B show an illustrative example in which the net center of mass of the outer mass 52 is moved from a radial distance of LO1 in FIG. 11A to a radial distance of LO2 in FIG. 11B.

For example, a mass shift section 253 may be configured as a direct-acting actuator that moves a rod extending inside the first rotation shaft 11 in an axial direction. A mechanism unit may be included that converts the linear movement of the rod to a rotational movement of the inner and outer divided bodies 251A, 251B, 252A, and 252B towards and apart from their corresponding members. Of course this is merely a non-limiting example and a wide variety of systems may be used to perform this function.

Referring again to FIGS. 11A and 11B, the movement of the net center of mass of the inner and outer masses 51, 52 (although only outer mass 52 is shown for the purpose of clarifying the figure), may result in a corresponding change in the amplitude of vibration without any change in frequency, for the same rotational velocity. In order to increase the amplitude for a given rotation, the net centers of mass would be moved from LO2 to LO1. To decrease the amplitude for a give rotation, the net centers of mass would be moved from LO1 to LO2. When the net centers of mass are aligned with the axis of rotation, the amplitude effectively becomes zero.

Figure 11C:
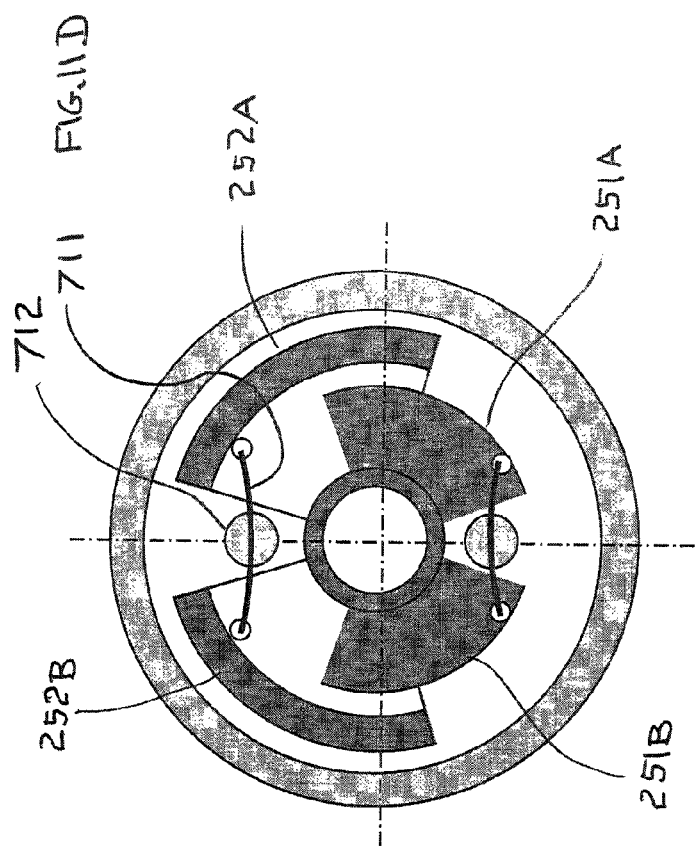
FIG. 11C is a schematic view illustrating an automatic mass shift system at relatively low rpm, according to an embodiment of the disclosure.
Figure 11D:
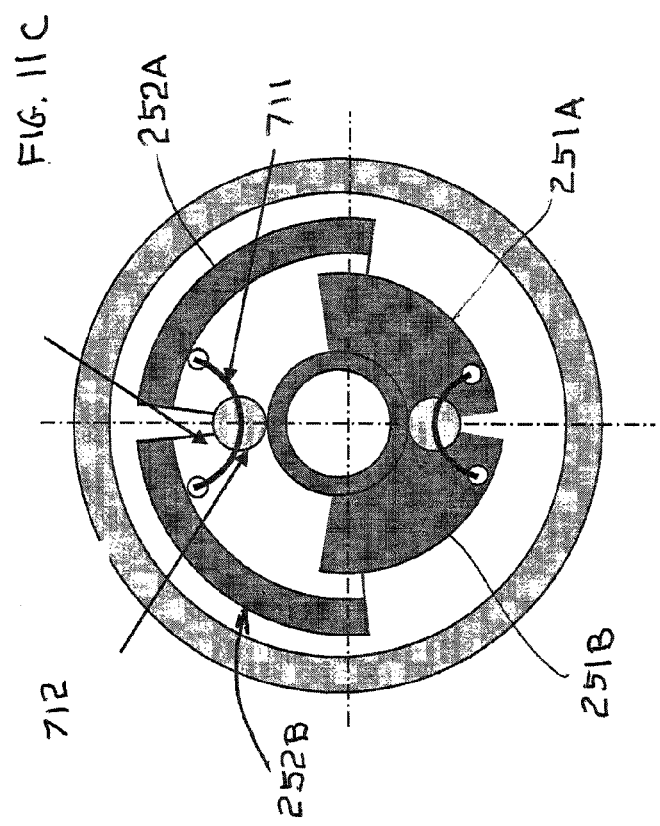
FIG. 11D is a schematic view illustrating the automatic mass shift system of FIG. 11C at relatively high rpm, according to an embodiment of the disclosure.

In other embodiments, the movement of the net centers of mass may be automatic, for example, based upon the rotational velocity of the inner and outer masses. Referring generally to FIGS. 11C and 11D shows an example of such a system. In this embodiment, a curved resilient member 711 is coupled to a control mass 712. During low rpm (as shown in FIG. 11C) the spring force of the resilient member 711 overcomes the centrifugal force of the control mass 712 and the inner divided bodies 251A, 251B and the outer divided bodies 252A, 252B remain rotatively close to one another (i.e., with their net centers of mass at the farthest radial distance from the axis of rotation).

As the rotational velocity increases, the centrifugal force of the control mass 712 overcomes the spring force of the resilient member 711 and the control mass moves away from the axis of rotation. The movement of the control mass rotatively moves the inner and outer divided bodies away from their corresponding members, resulting in the net centers of mass moving closer to the axis of rotation. A system such as the one described can be configured to automatically adjust the location of the net centers of mass to produce a relatively consistent vibration source for a small range of rotational velocities. Other configurations can be used to limit the amplitude of the force produced in the event the rotation is increased beyond a certain level.

Referring generally to FIG. 12, another embodiment of a seismic source 310 includes two vibration systems 50 aligned longitudinally (in an up and down direction in FIG. 12). The two vibration systems 50 may be configured to be rotated separately by respective drive sections 20 (not shown). When the two vibration systems 50 are rotated in longitudinal alignment, the vibration systems 50 produce a seismic force represented by the arrows provided in the center of the figure. In this case the seismic source 310 primarily produces P-waves, or pressure waves in a bilateral direction.

Figure 14:
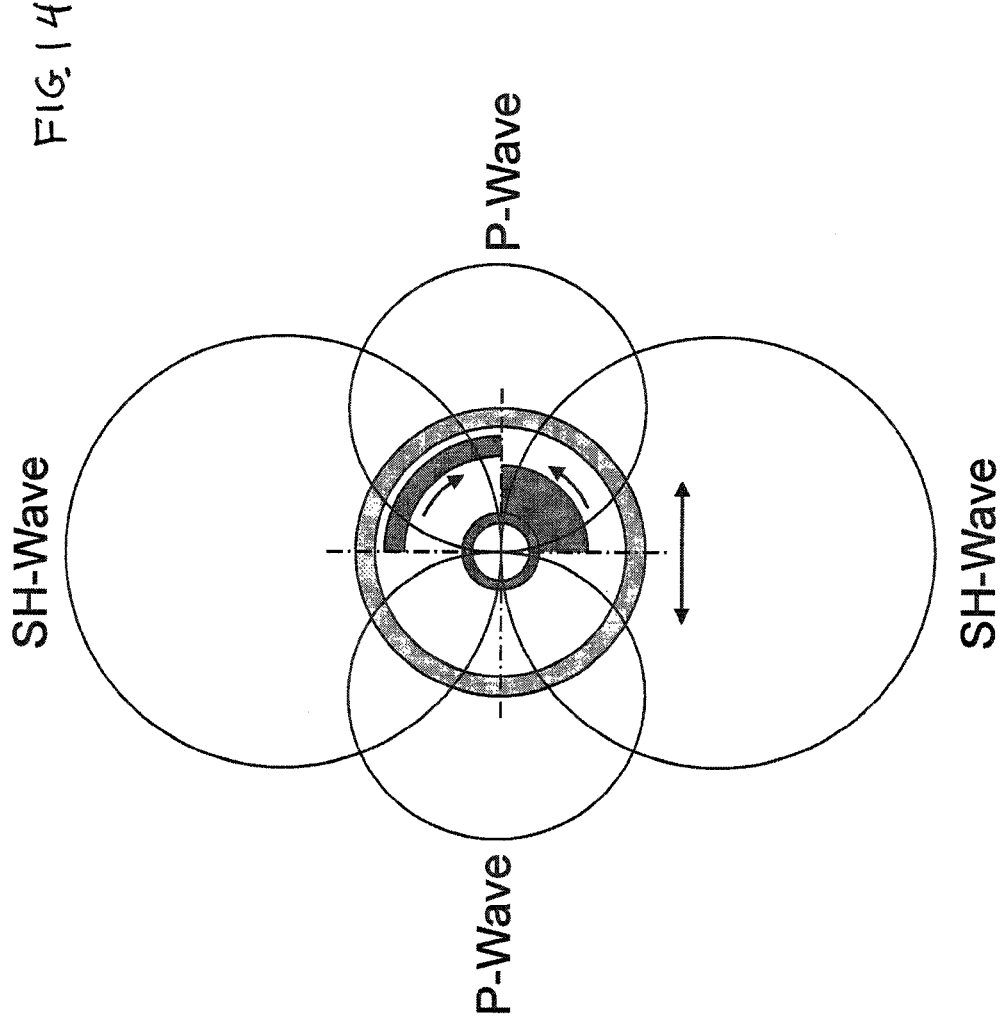
FIG. 14 is a schematic view illustrating types of seismic waves radiated from the seismic source shown in FIG. 13.

In some cases, one vibration system 50 may be 180 degrees out of phase with the other vibration system 50 (see FIG. 13). In such a case, the seismic source produces SH-waves or shear waves centered around the midpoint of the seismic source 310. As shown in more detail in FIG. 14, both SH-waves and P-waves can be produced by the embodiment shown in FIGS. 12 and 13.

Applications of embodiments of the present disclosure can be used in a variety of environments and situations. As non-limiting examples, embodiments of the present disclosure may be used in cross-well seismic surveys (see FIG. 15), single well seismic imaging (see FIG. 16), and reverse 3D-VSP (vertical seismic profiling) (see FIG. 17), among others.

Figure 15:
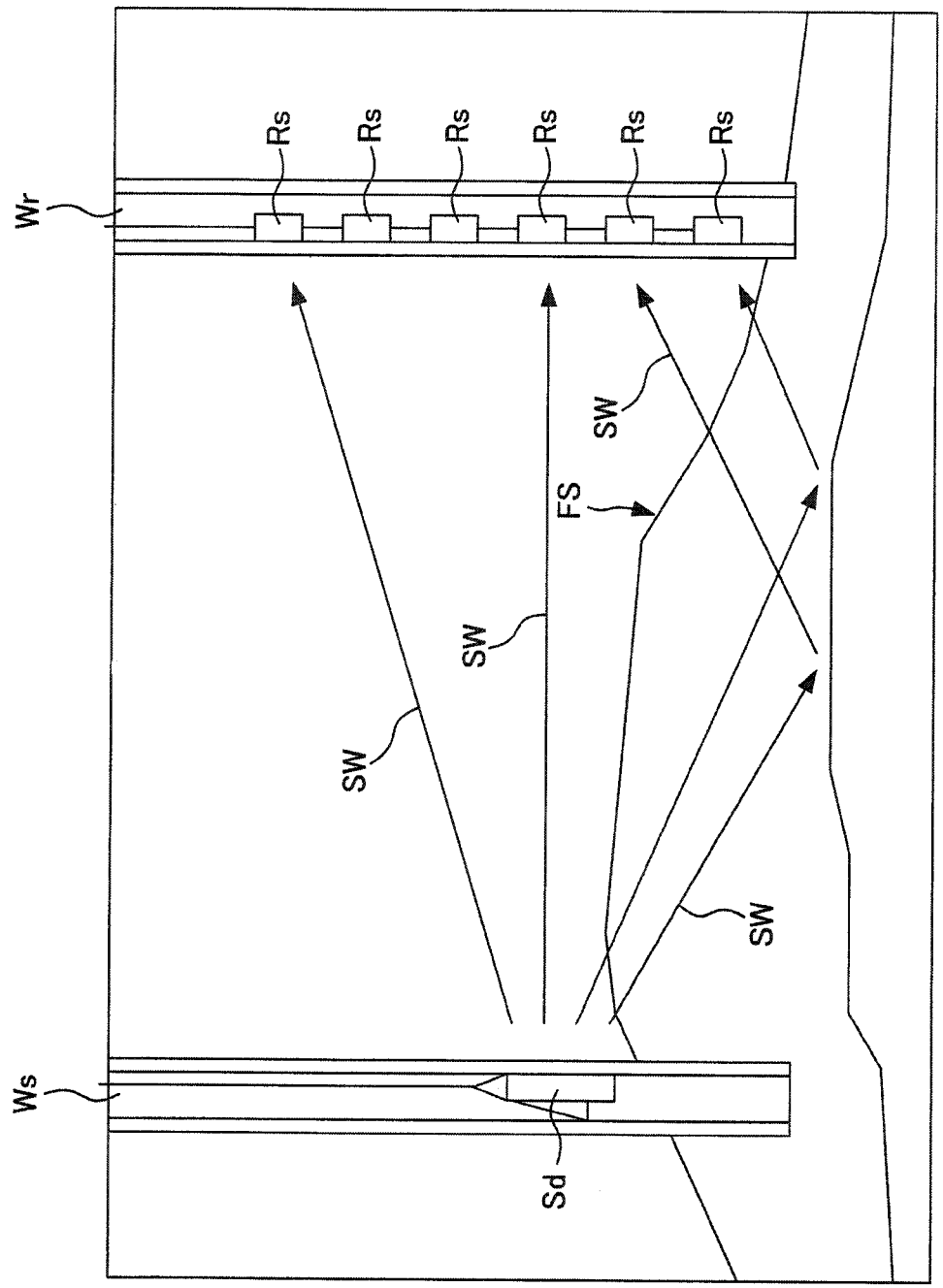
FIG. 15 is a schematic view illustrating an outline of a cross-hole seismic survey, according to an embodiment of the disclosure.

Cross-well seismic surveying is a method of imaging a reservoir at high resolution. In a general cross-well seismic survey, such as shown in FIG. 15, an array of a plurality of seismic receivers Rs, each constituted by a geophone and/or a hydrophone, are placed in a well Wr. A downhole seismic source Sd may be placed in a neighboring well Ws. Accordingly, seismic waves SW radiated from the downhole seismic source Sd can propagate to the seismic receivers Rs without having to propagate through the above-mentioned low velocity surface layer, which causes attenuation. Also, distances between the downhole seismic source Sd and the seismic receivers Rs can be shortened. As a result, it is possible to use high-frequency seismic waves for survey, and thus is possible to achieve a relatively precise resolution of an image to be obtained.

Figure 16:
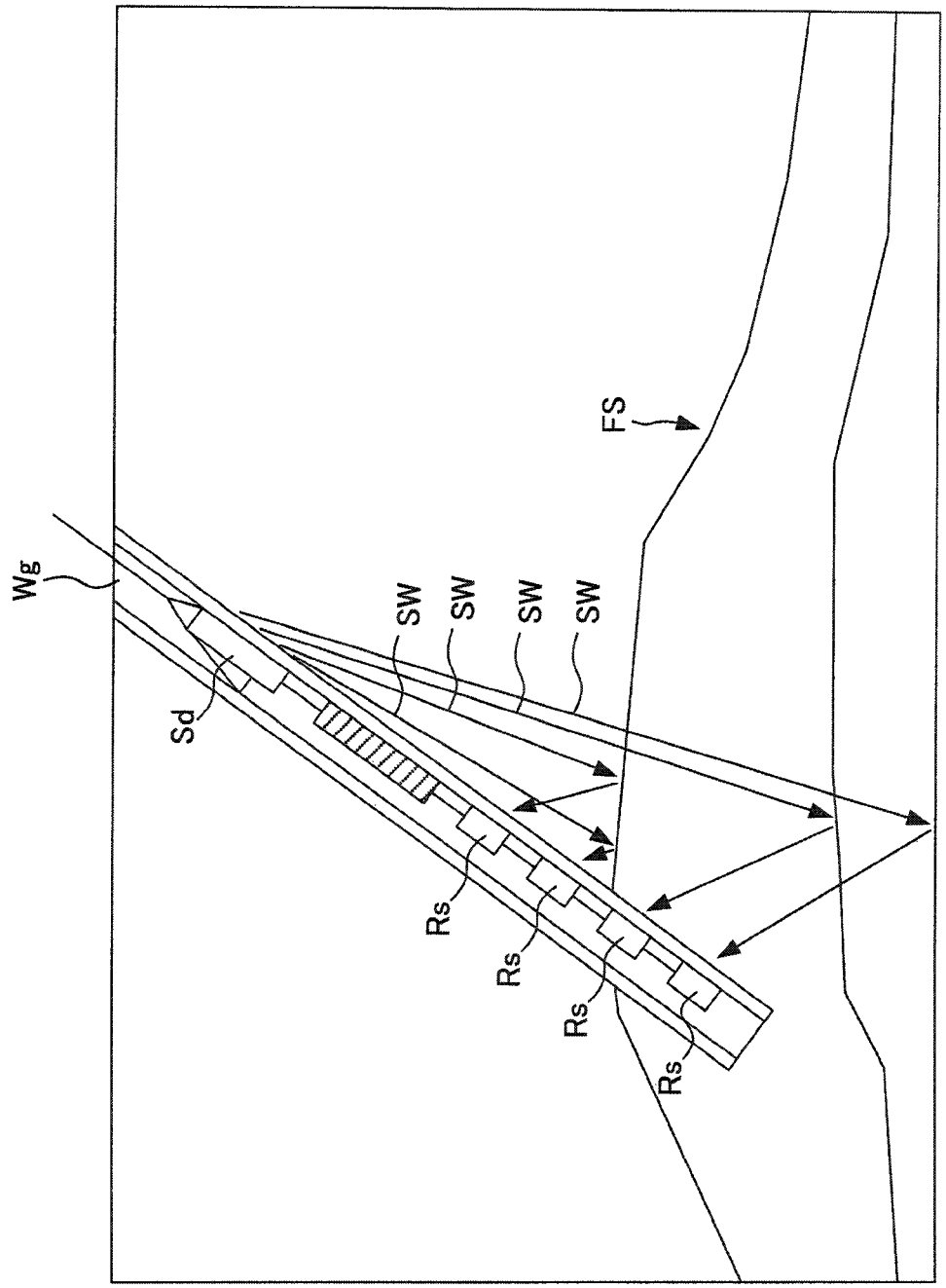
FIG. 16 is a schematic view illustrating an outline of Single Well Seismic Imaging, according to an embodiment of the disclosure.

Single well seismic imaging is a technique for imaging a subsurface structure at high resolution using a single well. In a general single well seismic imaging survey, such as shown in FIG. 16, one downhole seismic source Sd and an array of seismic receivers Rs, which are serially connected, are placed in an obliquely extending well Wg. The downhole seismic source Sd may be positioned above the array of seismic receivers Rs. With this configuration, seismic waves SW radiated from the downhole seismic source Sd can propagate to the seismic receivers Rs again without propagating through the above-mentioned low velocity surface layer, which causes attenuation.

In addition, the distance between the downhole seismic source Sd and the subsurface structure FS, and distances between the subsurface structure FS and the seismic receivers Rs can be minimized. Accordingly, it is possible to image at high resolution the subsurface structure FS around the well Wg and below the downhole seismic source Sd and the array of seismic receivers Rs, which are serially connected.

3D-VSP (vertical seismic profiling) is a technique for visualizing a subsurface structure around and below a well with a high resolution three-dimensional image. For example, to visualize a subsurface structure of a seabed, an array of a plurality of seismic receivers is placed in a well drilled in the seabed.

A seismic source, such as an air gun, may be fired every few seconds from a boat that sails above the well. The resulting seismic signals are received by the plurality of receivers located in the well. It is difficult to conduct such a seismic survey on land. This is partially due to various objects, such as surface topography, forests, buildings, etc., restricting the generation of energy. It is also difficult to generate seismic energy from multiple points on land by using vibrators.

Conversely, it is possible to attain the same results if the seismic source and the seismic receivers are reversed in position. Accordingly, it is possible to perform a so-called reverse 3D-VSP, in which the subsurface structure around the well and below the well is visualized with a high resolution three-dimensional image by using a downhole seismic source and an array of receivers located on the surface.

Figure 17:
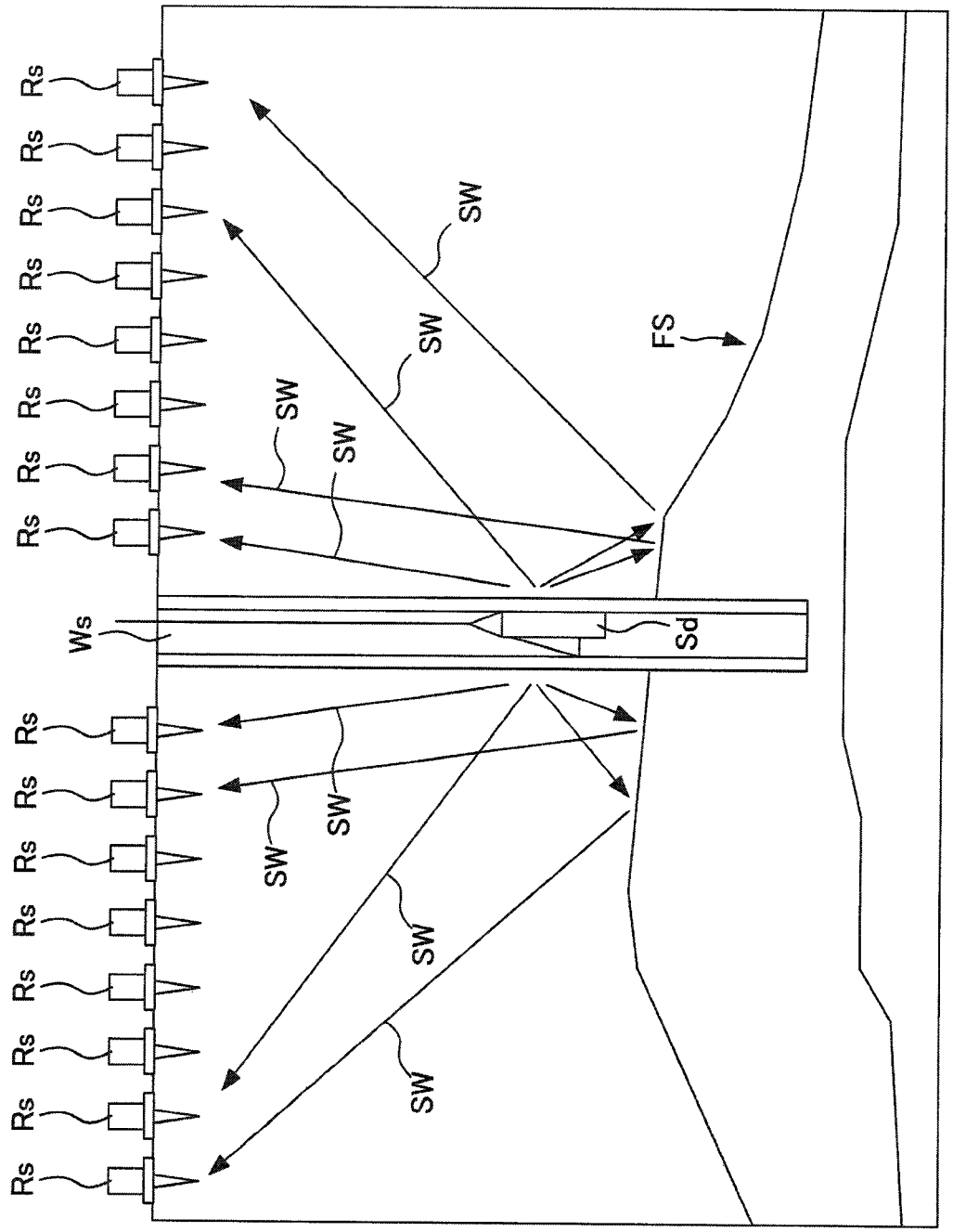
FIG. 17 is a schematic view illustrating an outline of Reverse 3D-VSP, according to an embodiment of the disclosure.

In a general reverse 3D-VSP, as shown in FIG. 17, one downhole seismic source Sd is placed in a well Ws extending in the ground and rows of a plurality of seismic receivers Rs are provided on the surface extending from the well Ws. The downhole source generates the seismic signal received by the array of seismic receivers provided on the surface. As compared with a 3D-VSP in which a huge vibrator is operated to generate seismic energy on the surface, reverse 3D-VSP, only requires a plurality of small geophones (the seismic receiver Rs) located around the well site. In many cases, a reverse 3D-VSP is a more practical survey method than a 3D-VSP or other methods, depending on the application conditions.

While the seismic source has been described with respect to a limited number of embodiments, those skilled in the art, having the benefit of this disclosure, will appreciate numerous modifications and variations there from. It is intended that the appended claims cover such modifications and variations as fall within the true spirit and scope of the seismic source and its applications.

What is claimed is:

1. A seismic source comprising:
   a first rotation member and a second rotation member having a common axis of rotation and rotated at a same angular rotation rate in mutually opposite directions;
   a first mass eccentrically coupled to the first rotation member and configured to rotate with the first rotation member; and
   a second mass eccentrically coupled to the second rotation member and configured to rotate with the second rotation member such that a second mass center of gravity is radially external to a first mass center of gravity and both centers of gravity are located at a same location along a length of the common axis of rotation.

2. The seismic source according to claim 1, wherein a magnitude of a centrifugal force generated by the same angular rotation of the first mass is substantially equal to a magnitude of a centrifugal force generated by the same angular rotation of the second mass.

3. The seismic source according to claim 1, wherein the first mass is configured in a sector shape and the second mass is configured in an arcuate shape when viewed in a cross-sectional view taken perpendicular to the common axis of rotation.

4. The seismic source according to claim 1, wherein the first rotation member is a columnar member, and the second rotation member is a cylindrical member at least partially accommodating the first rotation member.

5. The seismic source according to claim 1, wherein the center of gravity of the first mass is radially adjustable relative to the common axis of rotation.

6. The seismic source according to claim 1, wherein the center of gravity of the second mass is radially adjustable relative to the common axis of rotation.

7. The seismic source according to claim 1, wherein the center of gravity of the first mass and the center of gravity of the second mass are radially adjustable relative to the common axis of rotation.

8. The seismic source according to claim 1, further comprising:
   a phase control system that rotates a generated seismic signal about the common axis of rotation.

9. The seismic source according to claim 1, wherein the first and second rotation members are rotated via a single motor.

10. The seismic source according to claim 1, wherein the first rotation member is rotated via a first motor and a second rotation member is rotated via a second motor.

* * * * *